(12) United States Patent
Wei et al.

(10) Patent No.: US 12,461,615 B2
(45) Date of Patent: Nov. 4, 2025

(54) HAND GESTURE TRACKING DEVICE, METHOD, AND NON-TRANSITORY COMPUTER READABLE STORAGE MEDIUM THEREOF

(71) Applicant: HTC Corporation, Taoyuan (TW)

(72) Inventors: Chang Hua Wei, Taoyuan (TW); Yu-Ling Huang, Taoyuan (TW)

(73) Assignee: HTC Corporation, Taoyuan (TW)

( * ) Notice: Subject to any disclaimer, the term of this patent is extended or adjusted under 35 U.S.C. 154(b) by 0 days.

(21) Appl. No.: 18/617,629

(22) Filed: Mar. 26, 2024

(65) Prior Publication Data
US 2025/0306694 A1 Oct. 2, 2025

(51) Int. Cl.
*G06F 3/038* (2013.01)
*G06F 3/01* (2006.01)
*G06F 3/0346* (2013.01)
*G06V 40/20* (2022.01)

(52) U.S. Cl.
CPC .............. *G06F 3/038* (2013.01); *G06F 3/013* (2013.01); *G06F 3/016* (2013.01); *G06F 3/017* (2013.01); *G06F 3/0346* (2013.01); *G06V 40/28* (2022.01); *G06F 3/014* (2013.01); *G06F 2203/0331* (2013.01)

(58) Field of Classification Search
CPC .......... G06F 3/038; G06F 3/013; G06F 3/016; G06F 3/017; G06F 3/0346; G06F 3/014; G06F 2203/0331; G06V 40/28
See application file for complete search history.

(56) References Cited

U.S. PATENT DOCUMENTS

| | | | |
|---|---|---|---|
| 9,665,198 B2* | 5/2017 | Kies | G06F 3/016 |
| 10,073,523 B2* | 9/2018 | Venkatesan | A63F 13/218 |
| 10,599,219 B2* | 3/2020 | Choi | G06F 3/011 |
| 2016/0378186 A1* | 12/2016 | Kim | G06F 3/016 345/156 |
| 2019/0094967 A1* | 3/2019 | Bisbee | G06F 3/016 |
| 2019/0196578 A1* | 6/2019 | Iodice | G10K 11/346 |

(Continued)

FOREIGN PATENT DOCUMENTS

| | | |
|---|---|---|
| CN | 116820251 A | 9/2023 |
| CN | 117529699 A | 2/2024 |
| TW | 202324048 A | 6/2023 |

OTHER PUBLICATIONS

The office action of the corresponding Taiwanese application No. TW113143673 issued on Sep. 15, 2025.

*Primary Examiner* — Grant Sitta
(74) *Attorney, Agent, or Firm* — CKC & Partners Co., LLC

(57) ABSTRACT

A hand gesture tracking device, method, and non-transitory computer readable storage medium thereof are provided. The device performs hand gesture tracking corresponding to a user based on multiple real-time images and an inertial sensing data. The device determines whether a virtual object associated with a haptic feedback interaction is contacted based on the hand gesture tracking. In response to determining that the virtual object associated with the haptic feedback interaction is contacted, the device triggers a haptic feedback device of a wearable device to perform the haptic feedback interaction corresponding to a time interval. The device inactivates the inertial sensing data corresponding to the wearable device to perform the hand gesture tracking corresponding to the time interval.

18 Claims, 9 Drawing Sheets

(56) References Cited

U.S. PATENT DOCUMENTS

2019/0272034 A1* 9/2019 Pan ................... G06F 3/0346
2019/0324538 A1* 10/2019 Rihn .................. G06F 3/014
2020/0387224 A1* 12/2020 Das ................... G06F 3/016

* cited by examiner

HAND GESTURE TRACKING DEVICE, METHOD, AND NON-TRANSITORY COMPUTER READABLE STORAGE MEDIUM THEREOF

BACKGROUND

Field of Invention

The present invention relates to a hand gesture tracking device, method, and non-transitory computer readable storage medium thereof. More particularly, the present invention relates to a hand gesture tracking device, method, and non-transitory computer readable storage medium thereof that can dynamically adjust the time point of use of inertial sensing data.

Description of Related Art

In recent years, various technologies related to virtual reality have developed rapidly, and various related technologies and applications have been proposed one after another.

In the prior art, the head-mounted display can generate auxiliary data through the inertial sensing unit provided inside the wearable device (e.g., a smart ring) to improve the accuracy of hand gesture tracking.

In addition, in the prior art, wearable devices can be equipped with haptic feedback interactive components (e.g., vibrators) to provide users with haptic feedback (e.g., vibration feedback) interaction to improve operation experience of the user.

However, in the case where the wearable device has a haptic feedback interactive element, when the inertial sensing unit and the haptic feedback interactive element operate at the same time, the haptic feedback generated by the haptic feedback interactive element will cause the data generated by the inertial sensing unit to lose accuracy, thereby reducing the accuracy of gesture tracking.

Accordingly, there is an urgent need for a hand gesture tracking technology that can dynamically adjust the time point of use of inertial sensing data.

SUMMARY

An objective of the present disclosure is to provide a hand gesture tracking device. The hand gesture tracking device comprises a transceiver interface and a processor, and the processor is electrically connected to the transceiver interface. The transceiver interface is communicatively connected to a wearable device, the wearable device is configured to generate an inertial sensing data corresponding to a user, and the wearable device comprises a haptic feedback device. The processor performs a hand gesture tracking corresponding to the user based on a plurality of real-time images and the inertial sensing data, and the real-time images include a user hand or the wearable device used by the user. The processor determines whether a virtual object associated with a haptic feedback interaction is contacted based on the hand gesture tracking. In response to determining that the virtual object associated with the haptic feedback interaction is contacted, the processor triggers the haptic feedback device of the wearable device to execute the haptic feedback interaction corresponding to a time interval. The processor inactivates the inertial sensing data corresponding to the wearable device to perform the hand gesture tracking corresponding to the time interval.

Another objective of the present disclosure is to provide a hand gesture tracking method, which is adapted for use in an electronic device. The electronic device is communicatively connected to a wearable device, the wearable device is configured to generate an inertial sensing data corresponding to a user, the wearable device comprises a haptic feedback device. The hand gesture tracking method comprises the following steps: performing a hand gesture tracking corresponding to the user based on a plurality of real-time images and the inertial sensing data, wherein the real-time images include a user hand or the wearable device used by the user; determining whether a virtual object associated with a haptic feedback interaction is contacted based on the hand gesture tracking; in response to determining that the virtual object associated with the haptic feedback interaction is contacted, triggering the haptic feedback device of the wearable device to execute the haptic feedback interaction corresponding to a time interval; and inactivating the inertial sensing data corresponding to the wearable device to perform the hand gesture tracking corresponding to the time interval.

A further objective of the present disclosure is to provide a non-transitory computer readable storage medium having a computer program stored therein. The computer program comprises a plurality of codes, the computer program executes a hand gesture tracking method after being loaded into an electronic device. The electronic device is communicatively connected to a wearable device, the wearable device is configured to generate an inertial sensing data corresponding to a user, the wearable device comprises a haptic feedback device. The hand gesture tracking method comprises the following steps: performing a hand gesture tracking corresponding to the user based on a plurality of real-time images and the inertial sensing data, wherein the real-time images include a user hand or the wearable device used by the user; determining whether a virtual object associated with a haptic feedback interaction is contacted based on the hand gesture tracking; in response to determining that the virtual object associated with the haptic feedback interaction is contacted, triggering the haptic feedback device of the wearable device to execute the haptic feedback interaction corresponding to a time interval; and inactivating the inertial sensing data corresponding to the wearable device to perform the hand gesture tracking corresponding to the time interval.

According to the above descriptions, the hand gesture tracking technology (at least including the device, the method, and the non-transitory computer readable storage medium) provided by the present disclosure can pre-determine whether a virtual object has been contacted based on a variety of conditions, so as to dynamically adjust the time point at which the inertial sensing data is used. Therefore, the hand gesture tracking technology provided by the present disclosure can dynamically adjust the performing method of hand gesture tracking to avoid using the inertial sensing data of the period of time when the haptic feedback device is triggered. Accordingly, the accuracy of hand gesture tracking is improved, the shortcomings of the existing technology are solved, and the user's service experience is improved.

The detailed technology and preferred embodiments implemented for the subject disclosure are described in the following paragraphs accompanying the appended drawings for people skilled in this field to well appreciate the features of the claimed invention.

DETAILED DESCRIPTION

In the following description, a hand gesture tracking device, method, and non-transitory computer readable storage medium thereof according to the present disclosure will be explained with reference to embodiments thereof. However, these embodiments are not intended to limit the present disclosure to any environment, applications, or implementations described in these embodiments. Therefore, description of these embodiments is only for purpose of illustration rather than to limit the present disclosure. It shall be appreciated that, in the following embodiments and the attached drawings, elements unrelated to the present disclosure are omitted from depiction. In addition, dimensions of individual elements and dimensional relationships among individual elements in the attached drawings are provided only for illustration but not to limit the scope of the present disclosure.

Figure 1:
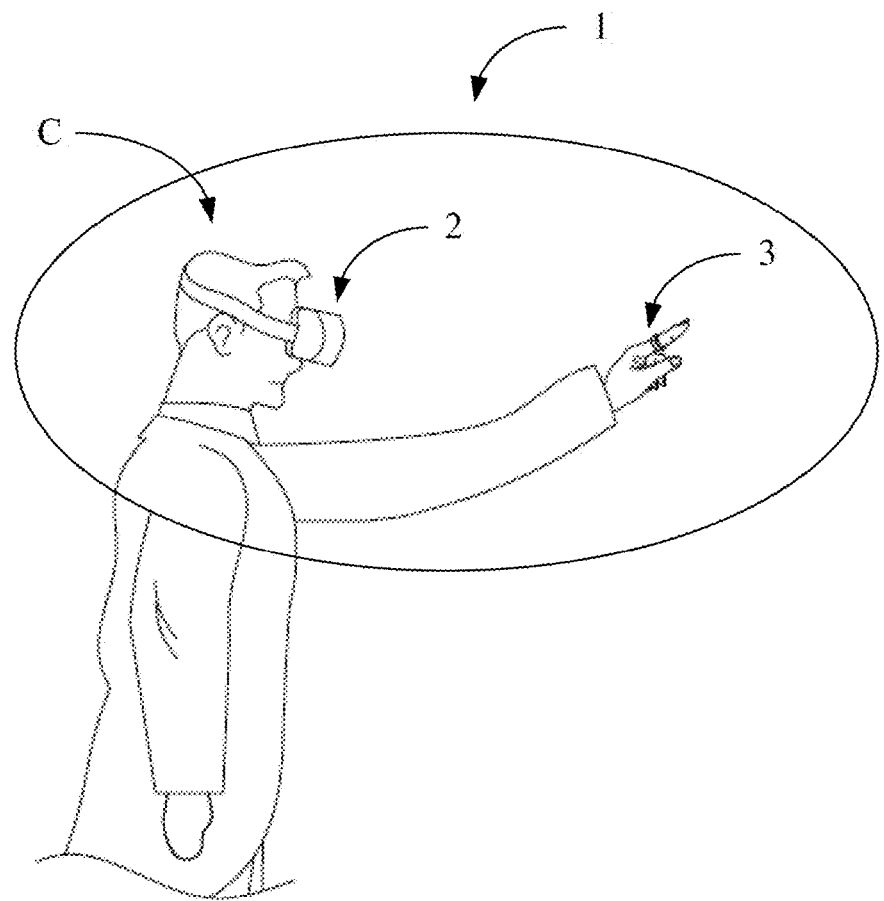
FIG. 1 is a schematic diagram depicting the hand gesture tracking system of the first embodiment.

First, the applicable scene of the present embodiment will be described, and a schematic diagram of which is depicted in FIG. 1. As shown in FIG. 1, in the application environment of the present disclosure, the hand gesture tracking system 1 comprises a hand gesture tracking device 2 and a wearable device 3, and the hand gesture tracking device 2 is communicatively connected to the wearable device 3.

As shown in FIG. 1, a user C may use a hand gesture tracking device 2 (e.g., the head-mounted display), and the user C may wear the wearable device 3 on a body part (e.g., the user C wears a smart ring on the index finger of the left hand) to perform interaction operations corresponding to the display screen of the hand gesture tracking device 2.

Figure 2A:
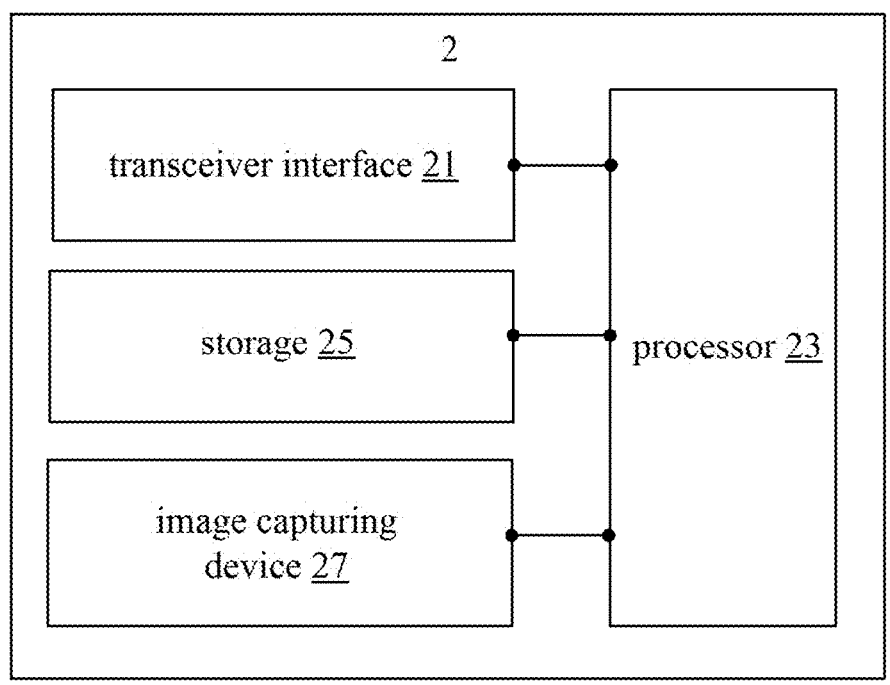
FIG. 2A is a schematic diagram depicting the hand gesture tracking device of some embodiments.

In the present embodiment, a schematic diagram of the structure of the hand gesture tracking device 2 is depicted in FIG. 2A. The hand gesture tracking device 2 comprises a transceiver interface 21, a processor 23, and a storage 25. The processor 23 is electrically connected to the transceiver interface 21 and the storage 25. The transceiver interface 21 is communicatively connected to the wearable device 3.

In some embodiments, as shown in FIG. 2A, the hand gesture tracking device 2 may further comprise an image capturing device 27, and the image capturing device 27 is coupled to the processor 23. The image capturing device 27 may comprise a plurality of image capturing units (e.g., a plurality of depth camera lenses) for capturing a plurality of real-time images including the wearable device 3 worn on a body part of the user C.

In some embodiments, the image capturing device 27 captures the plurality of real-time images corresponding to a field of view (FOV), and the body part (e.g., a second body part referred to in some embodiments) of the user C wearing the wearable device 3 is included in the field of view.

Figure 3:
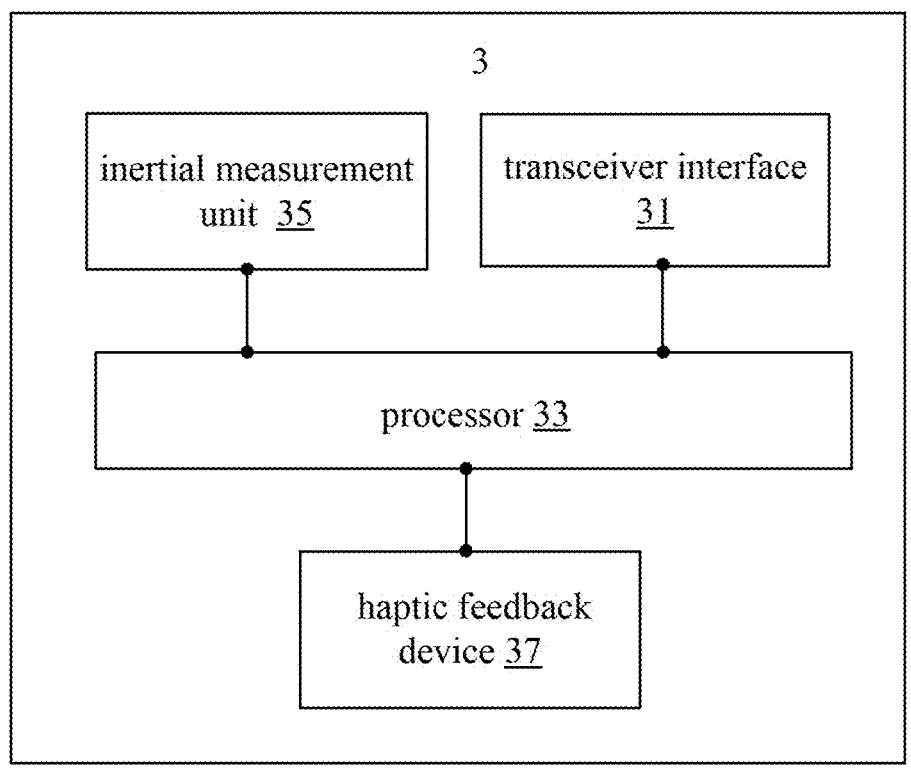
FIG. 3 is a schematic diagram depicting the wearable device of some embodiments.

In addition, in the present embodiment, a schematic diagram of the structure of the wearable device 3 is depicted in FIG. 3. The wearable device 3 comprises a transceiver interface 31, a processor 33, an inertial measurement unit 35, and a haptic feedback device 37. The processor 33 is coupled to the transceiver interface 31, the inertial measurement unit 35, and the haptic feedback device 37. The inertial measurement unit 35 is configured to detect the inertial measurement parameters corresponding to the body part of the user C wearing the wearable device 3.

Specifically, the inertial measurement unit 35 may continuously generate a series of inertial sensing data (e.g., a stream of inertial sensing data generated at a frequency of 90 times per second), and each of the inertial sensing data may comprises an acceleration, an amount of rotation, and an angular acceleration. During operation, the hand gesture tracking device 2 may periodically receive the inertial sensing data from the wearable device 3.

It shall be appreciated that the inertial sensing data generated by the wearable device 3 may correspond to the body parts of the user C (e.g., the body part of the finger). For example, the user C may wear the wearable device 3 on any finger to collect data. For convenience of description, in the present embodiment, the user C may be described wearing the wearable device 3 on the index finger.

It shall be appreciated that the haptic feedback device 37 is configured to generate a haptic feedback interaction. In some embodiments, the haptic feedback interaction is a vibration feedback interaction. For example, when the wearable device 3 is a smart ring, the haptic feedback device 37 can be a vibrator, and the vibrator can be used to generate vibration feedback interaction on the smart ring worn by the user C.

It shall be appreciated that the transceiver interface 21 and the transceiver interface 31 is an interface capable of receiving and transmitting data or other interfaces capable of receiving and transmitting data and known to those of ordinary skill in the art. The transceiver interface can receive data from sources such as external apparatuses, external web pages, external applications, and so on. The processor 23 and the processor 33 may be any of various processors, Central Processing Units (CPUs), microprocessors, digital signal processors or other computing apparatuses known to those of ordinary skill in the art. The storage 25 may be a memory, a Universal Serial Bus (USB) disk, a hard disk, a Compact Disk (CD), a mobile disk, or any other storage medium or circuit known to those of ordinary skill in the art and having the same functionality.

It shall be appreciated that FIG. 1 is merely an example for illustration, and the present disclosure does not limit the content of the hand gesture tracking system 1. For example, the present disclosure does not limit the number of wearable devices 3 connected to the hand gesture tracking device 2. The hand gesture tracking device 2 may be connected to a plurality of wearable devices through the network at the same time, depending on the scale and actual requirements of the hand gesture tracking system 1.

In the present embodiment, the processor 23 performs a hand gesture tracking corresponding to the user C based on a plurality of real-time images and the inertial sensing data, and the real-time images include user hang(s) and/or the wearable device 3 used by the user C.

Next, in the present embodiment, the processor 23 determines whether a virtual object associated with a haptic feedback interaction is contacted based on the hand gesture tracking.

Next, in response to determining that the virtual object associated with the haptic feedback interaction is contacted, the processor 23 triggers the haptic feedback device 37 of the wearable device 3 to execute the haptic feedback interaction corresponding to a time interval.

It shall be appreciated that when designing a virtual reality system, multiple virtual objects can be selected to be associated with the same or different haptic feedback interactions. For example, the virtual object may be a virtual button. When the processor 23 determines that the user C contacts the virtual button, the wearable device 3 activates a vibration feedback interaction.

For another example, the virtual object can be a plurality of three-dimensional spherical objects, and can be selected by the user C. When the processor 23 determines that the user C contacts one of the three-dimensional spherical objects, the wearable device 3 activates a vibration feedback interaction.

For another example, the virtual object can be a window object, which is resized/positioned by the user C. When the processor 23 determines that the user C contacts the window object, the wearable device 3 activates a vibration feedback interaction.

Finally, in the present embodiment, the processor 23 inactivates the inertial sensing data corresponding to the wearable device 3 to perform the hand gesture tracking corresponding to the time interval.

In some embodiments, when the haptic feedback interaction is no longer operating, the processor 23 can actively activate the inertial sensing data to improve the accuracy of hand gesture tracking. Specifically, in response to determining that the haptic feedback device 37 terminates execution of the haptic feedback interaction corresponding to the time interval, the processor 23 activates the inertial sensing data corresponding to the wearable device 3 to perform the hand gesture tracking corresponding to the user C.

In some embodiments, the processor 23 can transmit a control signal to the wearable device 3 to suspend the generation of the inertial sensing data to inactivate the inertial sensing data corresponding to the wearable device 3.

In some embodiments, the operation of inactivating the inertial sensing data corresponding to the wearable device 3 can be implemented by the processor 23 discarding or ignoring the inertial sensing data.

In some embodiments, the processor 23 can actively suspend processing of the inertial sensing data generated from the wearable device 3 to inactivate the inertial sensing data corresponding to the wearable device 3.

In some embodiments, the processor 23 can determine whether the interaction behavior of the user C meets some conditions to determine that the virtual object will be contacted in the future, and thus inactivate the inertial sensing data in advance. Specifically, the processor 23 determines whether an interactive behavior of the user C conforms at least one inactivating condition based on the hand gesture tracking. Next, in response to the interaction behavior conforming the at least one inactivating condition, the processor 23 determines that the virtual object associated with the haptic feedback interaction is contacted.

It shall be appreciated that the term "contacted" defined in the present disclosure includes that the virtual object has been contacted by the user C or the virtual object is about to be contacted by the user C (i.e., the user C has not yet physically touched the virtual object in the current time point). In some embodiments, when the processor 23 determines that the virtual object associated with the haptic feedback interaction is contacted, it indicates that the virtual object has been contacted by the user C. In some embodiments, when the processor 23 determines that the virtual object associated with the haptic feedback interaction is contacted, it indicates that the virtual object is about to be contacted by the user C.

In some embodiments, the at least one inactivating condition comprises at least one of a hand gesture determination condition, a movement determination condition, a target area determination condition, a gaze determination condition and a target path determination condition or a combination thereof.

The specific implementation details of each inactivating condition will be described in detail below. It shall be appreciated that each inactivating condition in the present disclosure can be implemented separately or in combination. For example, when the inactivating condition has two determination conditions, the processor 23 can determine whether the interactive behavior of the user C conforms one of the two determination conditions to determine whether the virtual object associated with the haptic feedback interaction is contacted. In addition, the processor 23 may also determine whether the interactive behavior of the user C conforms all of the two determination conditions to determine whether the virtual object associated with the haptic feedback interaction is contacted.

In some embodiments, the hand gesture tracking device 2 stores a plurality of target hand gestures. When the at least one inactivating condition comprises the hand gesture determination condition, the processor 23 determines whether the hand gesture of the user C conforms one of the target hand gestures to determine whether the virtual object is contacted, and the processor 23 inactivates the inertial sensing data when it is determined that the virtual object is contacted. Specifically, the processor 23 determines whether the interaction behavior conforms to one of a plurality of target hand gestures based on the hand gesture tracking. Then, in response to determining that the interaction behavior conforms to one of the target gestures, the processor 23 determines that the virtual object associated with the haptic feedback interaction is contacted.

In some embodiments, the processor 23 may input the hand gesture tracking to a convolutional neural network (e.g., a trained convolutional neural network) to determine a hand gesture corresponding to the user C.

Figure 4:
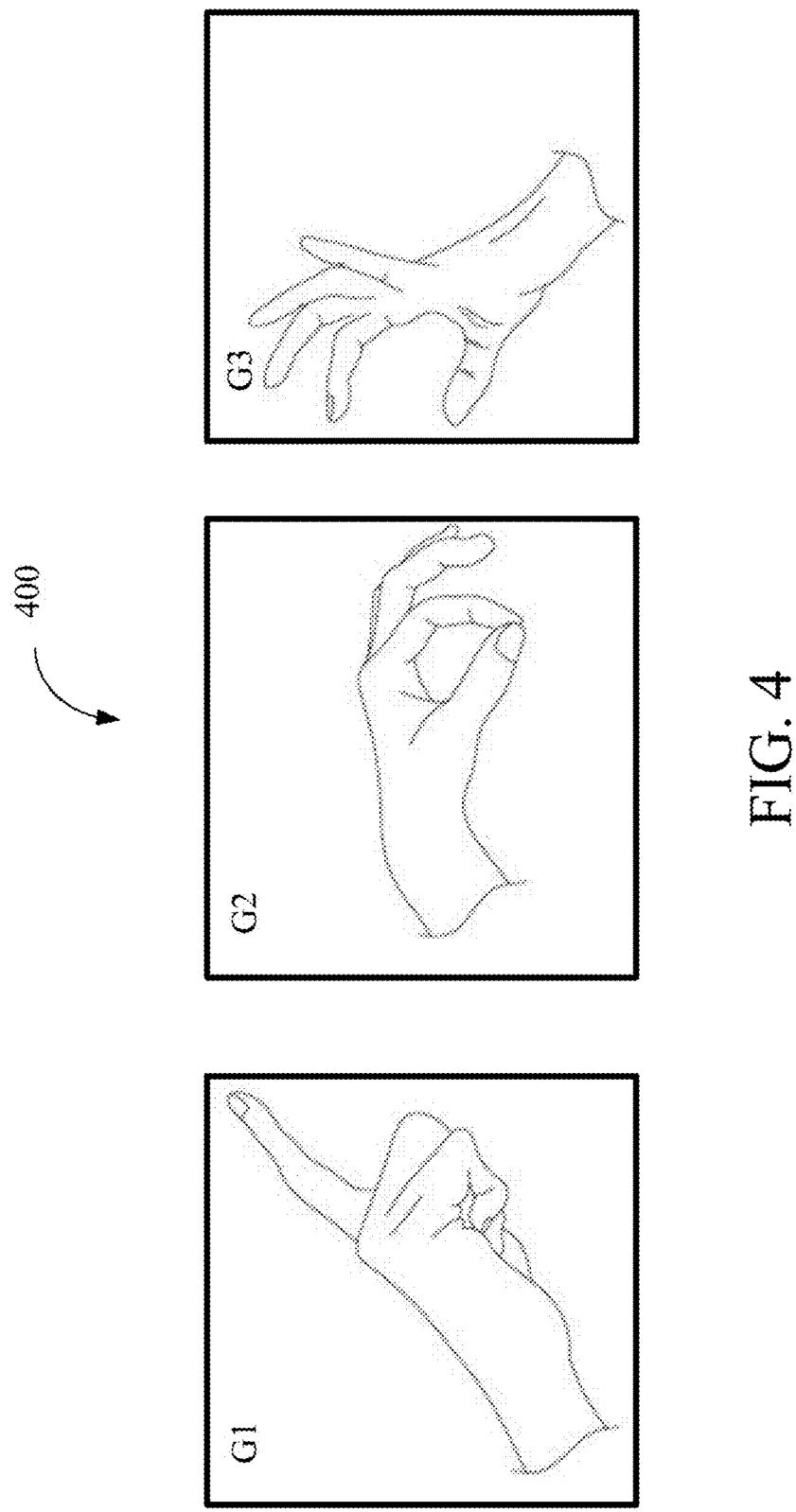
FIG. 4 is a schematic diagram depicting the target hand gestures of some embodiments.

For ease of understanding, please refer to the target hand gesture diagram 400 in FIG. 4. In the present example, the target hand gestures comprise the target hand gesture G1 with the index finger extended, the target hand gesture G2 with the index finger and thumb open for pinching, and the target hand gesture G3 with the palm open for grabbing. In the present example, when the processor 23 determines that the hand gesture of the user C conforms the target hand gesture G1, G2, or G3, it is determined that the virtual object is contacted.

In some embodiments, when the at least one inactivating condition comprises the movement determination condition, the processor 23 determines whether the hand action (e.g., arm action) of the user C conforms the target action to determine whether the virtual object is contacted, and the processor 23 inactivates the inertial sensing data when it is determined that the virtual object is contacted. Specifically, the processor 23 determines whether the interaction behavior conforms to an arm outstretching movement based on the hand gesture tracking. Next, in response to the interaction behavior conforming the at least one inactivating condition, the processor 23 determines that the virtual object associated with the haptic feedback interaction is contacted.

Figure 5A:
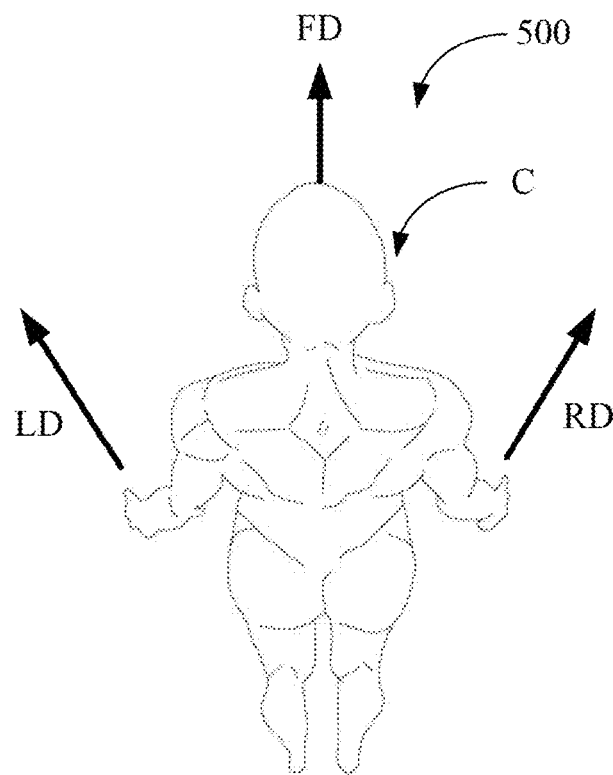
FIG. 5A is a schematic diagram depicting the arm outstretching movement of some embodiments.

For ease of understanding, please refer to the arm outstretching movement diagram 500 in FIG. 5A. In the present example, the arm outstretching movement (e.g., arm extending movement) includes an arm outstretching movement RD with the arm away from the body to the right, an arm outstretching movement LD with the arm away from the body to the left, and an arm outstretching movement FD with the arm away from the body to the forward. In the present example, when the processor 23 determines that the movement of the user C conforms the arm outstretching movement RD, LD or FD, it is determined that the virtual object is contacted.

In some embodiments, when the at least one inactivating condition comprises the target area determination condition, the processor 23 further extends the virtual object outward to expand the sensing area and determines whether the interaction behavior of the user C contacts the expanded sensing area, and the processor 23 inactivates the inertial sensing data when it is determined that the sensing area is contacted. Specifically, the processor 23 determines whether the interactive behavior is located in a target area of the virtual object based on the gesture tracking, wherein the target area is generated based on a regional space extending outward from a center or a surface of the virtual object. Then, in response to determining that the interactive behavior is located in the target area of the virtual object, the processor 23 determines that the virtual object associated with the haptic feedback interaction is contacted.

Figure 5B:
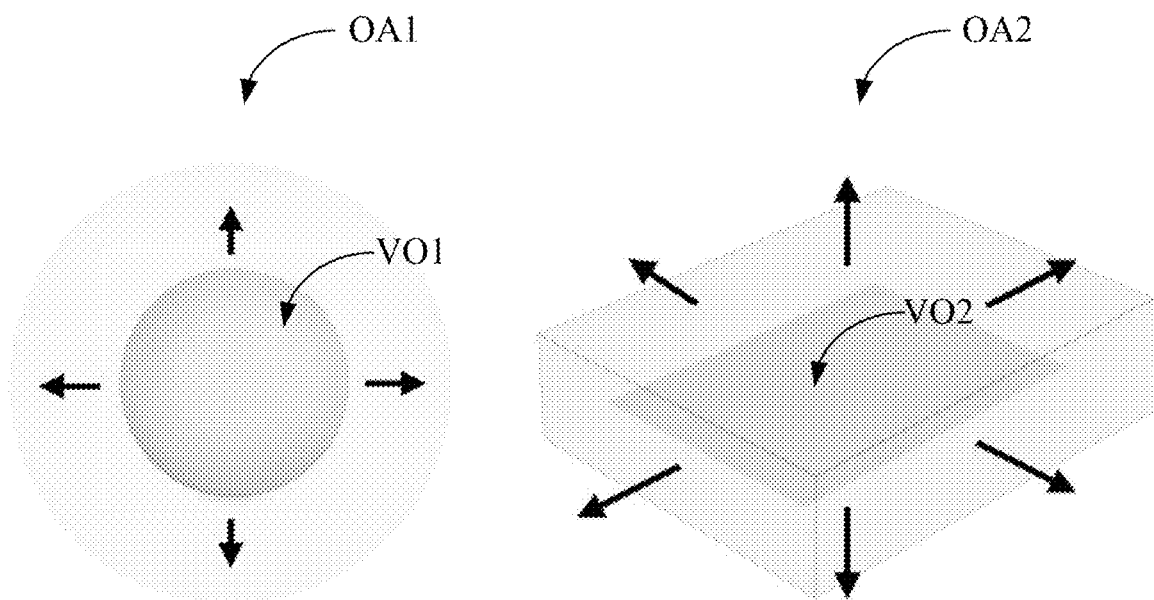
FIG. 5B is a schematic diagram depicting the target area of some embodiments.

For ease of understanding, please refer to the schematic diagram of the two target areas in FIG. 5B. In the example on the left, the virtual object VO1 is a three-dimensional spherical object, and the processor 23 extends a distance outward based on the spherical center or the surface of the virtual object VO1 to generate the target area OA1. In the example on the right, the virtual object VO2 is a two-dimensional plane object, and the processor 23 extends a distance outward based on the plane center or the surface of the virtual object VO2 to generate the target area OA2. In the present example, when the processor 23 determines that the interaction behavior of the user C is located in the target area OA1 or OA2 of the virtual object (e.g., the position of the hand), it is determined that the virtual object has been contacted.

Figure 2B:
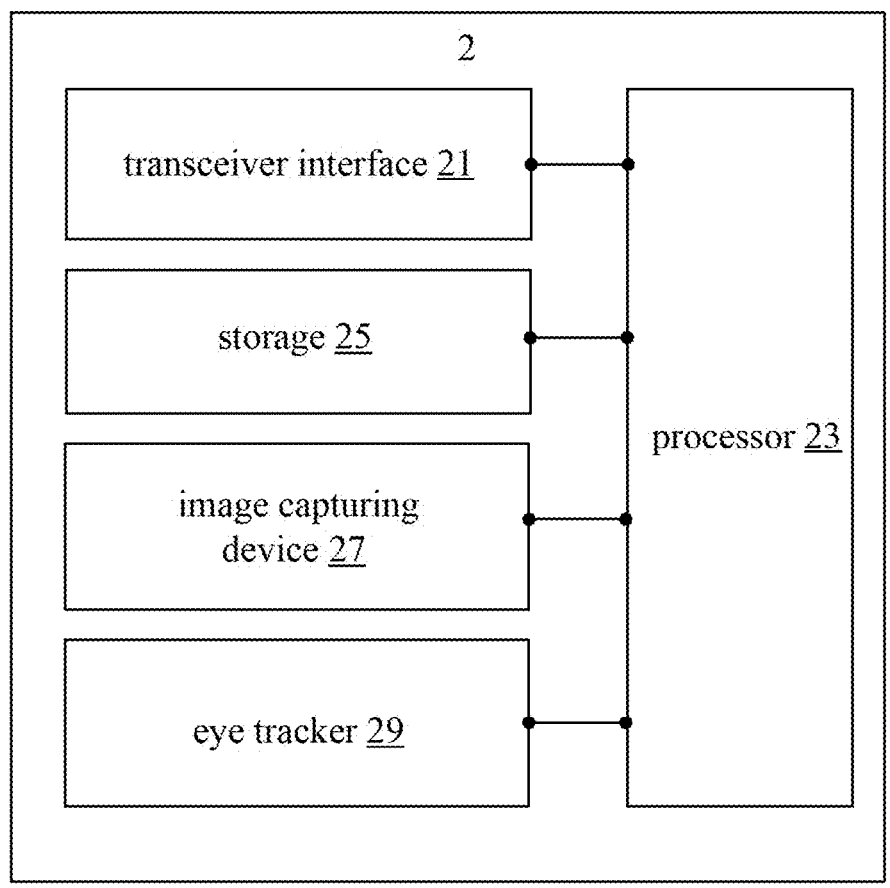
FIG. 2B is a schematic diagram depicting the hand gesture tracking device of some embodiments.

In some embodiments, in order to make the determination of the inactivating condition more accurate, the hand gesture tracking device 2 can further add the eye movement of the user C as one of the determination conditions. Specifically, as shown in FIG. 2B, the hand gesture tracking device 2 further comprises an eye tracker 29, and the eye tracker 29 is configured to generate a plurality of eye trajectories corresponding to the user C.

In some embodiments, the processor 23 further determines that the gaze position of the user C is on the virtual object to determine that the virtual object is contacted, and the processor 23 inactivates the inertial sensing data when it is determined that the virtual object is contacted. Specifically, the processor 23 generates a gaze position corresponding to the user based on a plurality of eyeball trajectories. Next, the processor 23 determines whether the gaze position is located on the virtual object. Finally, in response to determining that the gaze position is located on the virtual object, the processor 23 determines that the virtual object associated with the haptic feedback interaction is contacted.

In some embodiments, when the at least one inactivating condition comprises the target path determination condition, the processor 23 determines whether the hand movement path of the user C conforms to the target path to determine whether the virtual object is contacted, and the processor 23 inactivates the inertial sensing data when it is determined that the virtual object is contacted. Specifically, the processor 23 calculates a hand movement path of the user C. Next, the processor 23 determines whether the hand movement path is on a target path based on the hand gesture tracking, wherein the target path is composed of a current hand position of the user C and a spatial position corresponding to the virtual object. Then, in response to determining that the hand movement path is on the target path, the processor 23 determines that the virtual object associated with the haptic feedback interaction is contacted.

Figure 6:
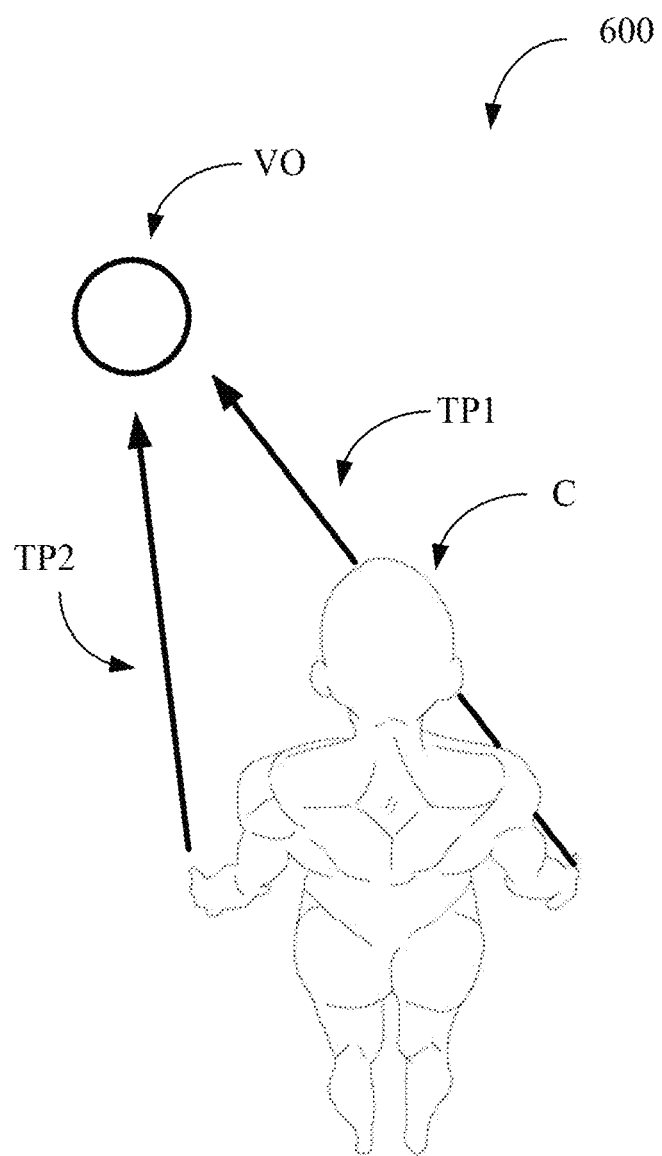
FIG. 6 is a schematic diagram depicting the target path of some embodiments.

For ease of understanding, please refer to the target path diagram 600 in FIG. 6. In the present example, the processor 23 generates the target path TP1 based on the current position of the right hand of the user C and the virtual object VO. The processor 23 generates the target path TP2 based on the current position of the left hand of the user C and the virtual object VO. In the present example, when the processor 23 determines that the hand movement path of the user C is located on the target path TP1 or TP2, it is determined that the virtual object has been contacted.

Figure 7:
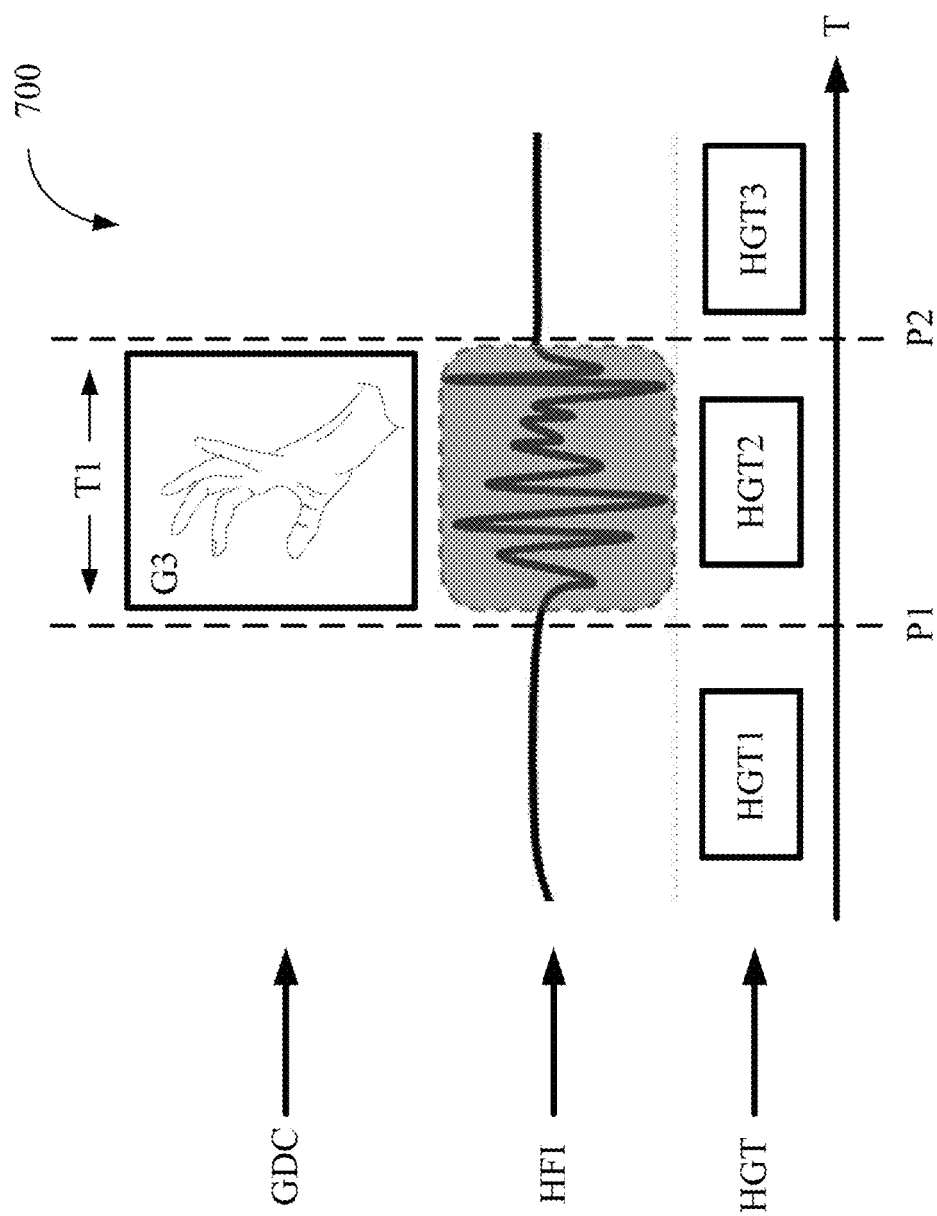
FIG. 7 is a schematic diagram depicting the operation sequence of some embodiments.

For ease of understanding, an actual implementation example is used to illustrate, please refer to the operation sequence diagram 700 of FIG. 7, in which the horizontal axis is the time value T. In the present example, the processor 23 performs hand gesture tracking HGT in each time interval, and the inactivating condition comprises the hand gesture determination condition GDC.

First, before the time point P1, the processor 23 determines that the virtual object has not been contacted, so the processor 23 performs the hand gesture tracking HGT1 corresponding to the user C based on the real-time images and the inertial sensing data.

Next, the processor 23 determines that the interactive behavior of the user C conforms to the target gesture G3 between the time point P1 and the time point P2 (i.e., the time interval T1). Therefore, the processor 23 triggers the haptic feedback device 37 of the wearable device 3 in the time interval T1 to execute the haptic feedback interaction HFI, and inactivates the inertial sensing data corresponding to the wearable device 3 in the time interval T1 to perform the hand gesture tracking HGT2 corresponding to the time interval T1.

In addition, after the time point P2, the processor 23 determines that the virtual object has not been contacted, and therefore actively activates the inertial sensing data corresponding to the wearable device 3. Then, the processor 23 performs the hand gesture tracking HGT3 corresponding to the user C based on the real-time images and the inertial sensing data.

In some embodiments, the processor 23 may only inactivate the inertial sensing data corresponding to the wearable device 3 at the time point when the haptic feedback device 37 executes the haptic feedback interaction HFI (e.g., the time between time point P1 and time point P2 in FIG. 7). In addition, when the haptic feedback device 37 does not continue to operate, the processor 23 activates the inertial sensing data of the wearable device 3 to perform the hand gesture tracking corresponding to the user C.

According to the above descriptions, the hand gesture tracking device 2 provided by the present disclosure can pre-determine whether a virtual object has been contacted based on a variety of conditions, so as to dynamically adjust the time point at which the inertial sensing data is used. Therefore, the hand gesture tracking device 2 provided by the present disclosure can dynamically adjust the performing method of hand gesture tracking to avoid using the inertial sensing data of the period of time when the haptic feedback device is triggered. Accordingly, the accuracy of hand gesture tracking is improved, the shortcomings of the existing technology are solved, and the user's service experience is improved.

Figure 8:
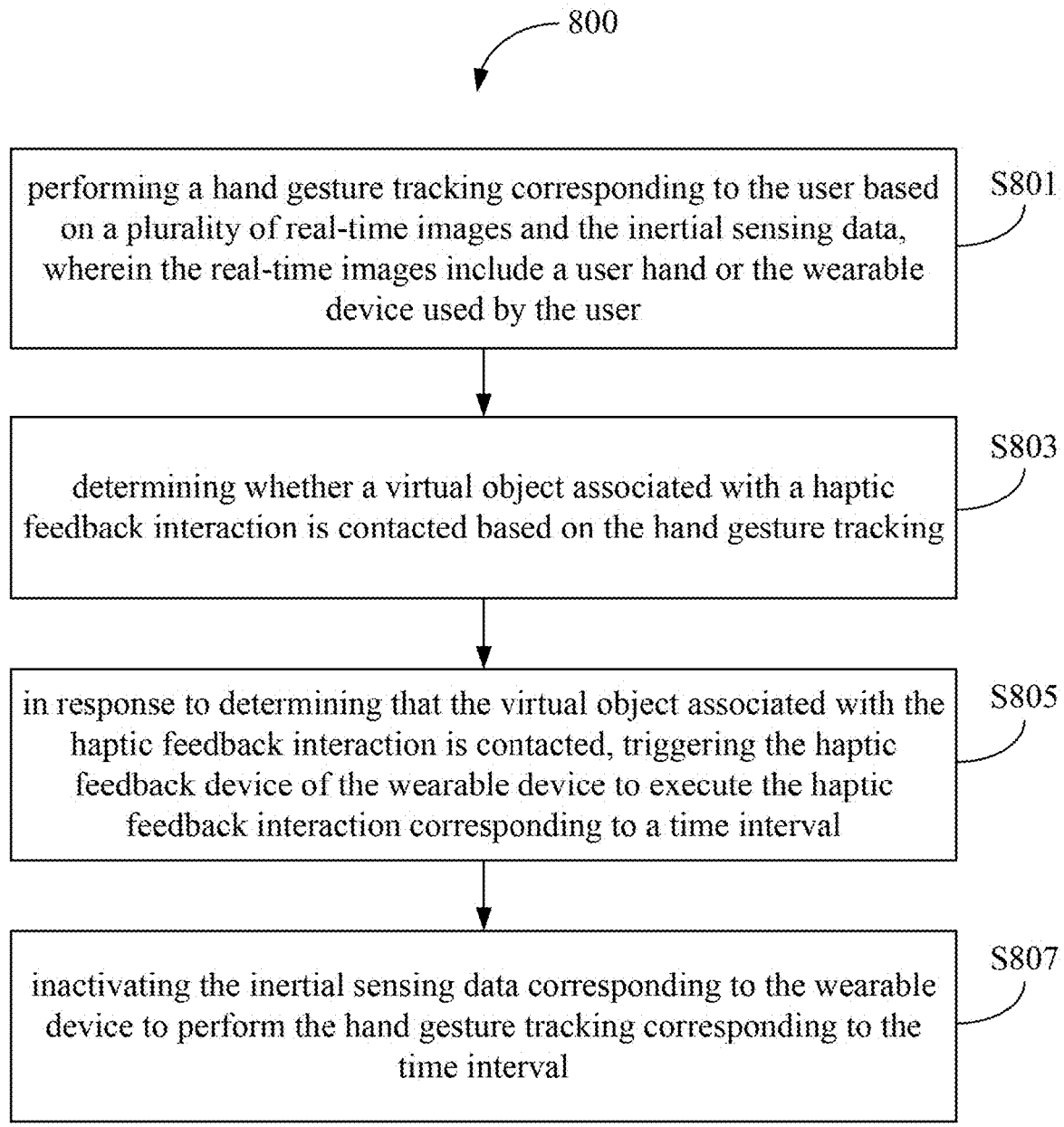
FIG. 8 is a partial flowchart depicting the hand gesture tracking method of the second embodiment.

A second embodiment of the present disclosure is a hand gesture tracking method and a flowchart thereof is depicted in FIG. 8. The hand gesture tracking method 800 is adapted for an electronic device (e.g., the hand gesture tracking device 2 described in the first embodiment). The electronic device is communicatively connected to a wearable device (e.g., the wearable device 3 described in the first embodiment). The wearable device is configured to generate an inertial sensing data corresponding to a user, the wearable device comprises a haptic feedback device. The hand gesture tracking method 800 performs the hand gesture tracking through the steps S801 to S807.

In the step S801, the electronic device performs a hand gesture tracking corresponding to the user based on a plurality of real-time images and the inertial sensing data, wherein the real-time images include a user hand or the wearable device used by the user.

Next, in the step S803, the electronic device determines whether a virtual object associated with a haptic feedback interaction is contacted based on the hand gesture tracking.

Next, in the step S805, in response to determining that the virtual object associated with the haptic feedback interaction is contacted, the electronic device triggers the haptic feedback device of the wearable device to execute the haptic feedback interaction corresponding to a time interval.

Finally, in the step S807, the electronic device inactivates the inertial sensing data corresponding to the wearable device to perform the hand gesture tracking corresponding to the time interval.

In some embodiments, the hand gesture tracking method 800 further comprises the following steps: in response to determining that the haptic feedback device terminates execution of the haptic feedback interaction corresponding to the time interval, activating the inertial sensing data corresponding to the wearable device to perform the hand gesture tracking corresponding to the user.

In some embodiments, the step of determining whether the virtual object associated with the haptic feedback interaction is contacted comprises the following steps: determining whether an interactive behavior of the user conforms at least one inactivating condition based on the hand gesture tracking; and in response to the interaction behavior conforming the at least one inactivating condition, determining that the virtual object associated with the haptic feedback interaction is contacted.

In some embodiments, the at least one inactivating condition comprises at least one of a hand gesture determination condition, a movement determination condition, a target area determination condition, a gaze determination condition and a target path determination condition or a combination thereof.

In some embodiments, when the at least one inactivating condition comprises the hand gesture determination condition, the hand gesture tracking method 800 further performs the following steps: determining whether the interaction behavior conforms to one of a plurality of target hand gestures based on the hand gesture tracking; and in response to determining that the interactive behavior conforms to one of the target hand gestures, determining that the virtual object associated with the haptic feedback interaction is contacted.

In some embodiments, when the at least one inactivating condition comprises the movement determination condition, the hand gesture tracking method 800 further performs the following steps: determining whether the interaction behavior conforms to an arm outstretching movement based on the hand gesture tracking; and in response to determining that the interactive behavior conforms to the arm outstretching movement, determining that the virtual object associated with the haptic feedback interaction is contacted.

In some embodiments, when the at least one inactivating condition comprises the target area determination condition, the hand gesture tracking method 800 further performs the following steps: determining whether the interactive behavior is located in a target area of the virtual object based on the gesture tracking, wherein the target area is generated based on a regional space extending outward from a center of the virtual object; and in response to determining that the interactive behavior is located in the target area of the virtual object, determining that the virtual object associated with the haptic feedback interaction is contacted.

In some embodiments, when the at least one inactivating condition comprises the gaze determination condition, the hand gesture tracking method 800 further performs the following steps: generating a gaze position corresponding to the user based on a plurality of eyeball trajectories; determining whether the gaze position is located on the virtual object; and in response to determining that the gaze position is located on the virtual object, determining that the virtual object associated with the haptic feedback interaction is contacted.

In some embodiments, when the at least one inactivating condition comprises the target path determination condition, the hand gesture tracking method 800 further performs the following steps: calculating a hand movement path of the user; determining whether the hand movement path is on a target path based on the hand gesture tracking, wherein the target path is composed of a current hand position of the user and a spatial position corresponding to the virtual object; and in response to determining that the hand movement path is on the target path, determining that the virtual object associated with the haptic feedback interaction is contacted.

In addition to the aforesaid steps, the second embodiment can also execute all the operations and steps of the hand gesture tracking device 2 set forth in the first embodiment, have the same functions, and deliver the same technical effects as the first embodiment. How the second embodiment executes these operations and steps, has the same functions, and delivers the same technical effects will be readily appreciated by those of ordinary skill in the art based on the explanation of the first embodiment. Therefore, the details will not be repeated herein.

The hand gesture tracking method described in the second embodiment may be implemented by a computer program having a plurality of codes. The computer program may be a file that can be transmitted over the network, or may be stored into a non-transitory computer readable storage medium. After the codes of the computer program are loaded into an electronic device (e.g., the hand gesture tracking device 2), the computer program executes the hand gesture tracking method as described in the second embodiment. The non-transitory computer readable storage medium may be an electronic product, e.g., a read only memory (ROM), a flash memory, a floppy disk, a hard disk, a compact disk (CD), a mobile disk, a database accessible to networks, or any other storage medium with the same function and well known to those of ordinary skill in the art.

According to the above descriptions, the hand gesture tracking technology (at least including the device, the method, and the non-transitory computer readable storage medium) provided by the present disclosure can pre-determine whether a virtual object has been contacted based on a variety of conditions, so as to dynamically adjust the time point at which the inertial sensing data is used. Therefore, the hand gesture tracking technology provided by the present disclosure can dynamically adjust the performing method of hand gesture tracking to avoid using the inertial sensing data of the period of time when the haptic feedback device is triggered. Accordingly, the accuracy of hand gesture tracking is improved, the shortcomings of the existing technology are solved, and the user's service experience is improved.

The above disclosure is related to the detailed technical contents and inventive features thereof. People skilled in this field may proceed with a variety of modifications and replacements based on the disclosures and suggestions of the disclosure as described without departing from the characteristics thereof. Nevertheless, although such modifications and replacements are not fully disclosed in the above descriptions, they have substantially been covered in the following claims as appended.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A hand gesture tracking device, comprising:
   a transceiver interface, being communicatively connected to a wearable device, wherein the wearable device is configured to generate an inertial sensing data corresponding to a user, and the wearable device comprises a haptic feedback device; and
   a processor, being electrically connected to the transceiver interface, and being configured to perform the following operations:
      performing a hand gesture tracking corresponding to the user based on a plurality of real-time images and the inertial sensing data, wherein the real-time images include a user hand or the wearable device used by the user;
      determining whether a virtual object associated with a haptic feedback interaction is contacted based on the hand gesture tracking and a plurality of eyeball trajectories;
      in response to determining that the virtual object associated with the haptic feedback interaction is contacted, triggering the haptic feedback device of the wearable device to execute the haptic feedback interaction corresponding to a time interval; and
      inactivating the inertial sensing data corresponding to the wearable device to perform the hand gesture tracking corresponding to the time interval,
      wherein the operation of determining whether the virtual object associated with the haptic feedback interaction is contacted comprises the following operations;
      generating a gaze position corresponding to the user based on the plurality of eyeball trajectories;
      determining whether the gaze position is located on the virtual object; and
      in response to determining that the gaze position is located on the virtual object, determining that the virtual object associated with the haptic feedback interaction is contacted.

2. The hand gesture tracking device of claim 1, wherein the processor is further configured to perform the following operations:
   in response to determining that the haptic feedback device terminates execution of the haptic feedback interaction corresponding to the time interval, activating the inertial sensing data corresponding to the wearable device to perform the hand gesture tracking corresponding to the user.

3. The hand gesture tracking device of claim 1, wherein the operation of determining whether the virtual object associated with the haptic feedback interaction is contacted further comprises the following operations:
   determining whether an interactive behavior of the user conforms at least one inactivating condition based on the hand gesture tracking; and
   in response to the interaction behavior conforming the at least one inactivating condition, determining that the virtual object associated with the haptic feedback interaction is contacted.

4. The hand gesture tracking device of claim 3, wherein the at least one inactivating condition comprises at least one of a hand gesture determination condition, a movement determination condition, a target area determination condition, a gaze determination condition and a target path determination condition or a combination thereof.

5. The hand gesture tracking device of claim 4, wherein when the at least one inactivating condition comprises the hand gesture determination condition, the processor further performs the following operations:
   determining whether the interaction behavior conforms to one of a plurality of target hand gestures based on the hand gesture tracking; and
   in response to determining that the interactive behavior conforms to one of the target hand gestures, determining that the virtual object associated with the haptic feedback interaction is contacted.

6. The hand gesture tracking device of claim 4, wherein when the at least one inactivating condition comprises the movement determination condition, the processor further performs the following operations:
   determining whether the interaction behavior conforms to an arm outstretching movement based on the hand gesture tracking; and
   in response to determining that the interactive behavior conforms to the arm outstretching movement, determining that the virtual object associated with the haptic feedback interaction is contacted.

7. The hand gesture tracking device of claim 4, wherein when the at least one inactivating condition comprises the target area determination condition, the processor further performs the following operations:
   determining whether the interactive behavior is located in a target area of the virtual object based on the hand gesture tracking, wherein the target area is generated based on a regional space extending outward from a center of the virtual object; and in response to determining that the interactive behavior is located in the target area of the virtual object, determining that the virtual object associated with the haptic feedback interaction is contacted.

8. The hand gesture tracking device of claim 4, wherein when the at least one inactivating condition comprises the target path determination condition, the processor further performs the following operations:

calculating a hand movement path of the user;

determining whether the hand movement path is on a target path based on the hand gesture tracking, wherein the target path is composed of a current hand position of the user and a spatial position corresponding to the virtual object; and in response to determining that the hand movement path is on the target path, determining that the virtual object associated with the haptic feedback interaction is contacted.

9. The hand gesture tracking device of claim 1, wherein the haptic feedback interaction is a vibration feedback interaction.

10. A hand gesture tracking method, being adapted for use in an electronic device, wherein the electronic device is communicatively connected to a wearable device, the wearable device is configured to generate an inertial sensing data corresponding to a user, the wearable device comprises a haptic feedback device, and the hand gesture tracking method comprises:

performing a hand gesture tracking corresponding to the user based on a plurality of real-time images and the inertial sensing data, wherein the real-time images include a user hand or the wearable device used by the user;

determining whether a virtual object associated with a haptic feedback interaction is contacted based on the hand gesture tracking and a plurality of eyeball trajectories;

in response to determining that the virtual object associated with the haptic feedback interaction is contacted, triggering the haptic feedback device of the wearable device to execute the haptic feedback interaction corresponding to a time interval; and inactivating the inertial sensing data corresponding to the wearable device to perform the hand gesture tracking corresponding to the time interval, wherein the step of determining whether the virtual object associated with the haptic feedback interaction is contacted comprises the following steps:

generating a gaze position corresponding to the user based on the plurality of eyeball trajectories;

determining whether the gaze position is located on the virtual object; and in response to determining that the gaze position is located on the virtual object, determining that the virtual object associated with the haptic feedback interaction is contacted.

11. The hand gesture tracking method of claim 10, wherein the hand gesture tracking method further comprises the following steps:

in response to determining that the haptic feedback device terminates execution of the haptic feedback interaction corresponding to the time interval, activating the inertial sensing data corresponding to the wearable device to perform the hand gesture tracking corresponding to the user.

12. The hand gesture tracking method of claim 10, wherein the step of determining whether the virtual object associated with the haptic feedback interaction is contacted further comprises the following steps:

determining whether an interactive behavior of the user conforms at least one inactivating condition based on the hand gesture tracking; and in response to the interaction behavior conforming the at least one inactivating condition, determining that the virtual object associated with the haptic feedback interaction is contacted.

13. The hand gesture tracking method of claim 12, wherein the at least one inactivating condition comprises at least one of a hand gesture determination condition, a movement determination condition, a target area determination condition, a gaze determination condition and a target path determination condition or a combination thereof.

14. The hand gesture tracking method of claim 13, wherein when the at least one inactivating condition comprises the hand gesture determination condition, the hand gesture tracking method further performs the following steps:

determining whether the interaction behavior conforms to one of a plurality of target hand gestures based on the hand gesture tracking; and in response to determining that the interactive behavior conforms to one of the target hand gestures, determining that the virtual object associated with the haptic feedback interaction is contacted.

15. The hand gesture tracking method of claim 13, wherein when the at least one inactivating condition comprises the movement determination condition, the hand gesture tracking method further performs the following steps:

determining whether the interaction behavior conforms to an arm outstretching movement based on the hand gesture tracking; and in response to determining that the interactive behavior conforms to the arm outstretching movement, determining that the virtual object associated with the haptic feedback interaction is contacted.

16. The hand gesture tracking method of claim 13, wherein when the at least one inactivating condition comprises the target area determination condition, the hand gesture tracking method further performs the following steps:

determining whether the interactive behavior is located in a target area of the virtual object based on the hand gesture tracking, wherein the target area is generated based on a regional space extending outward from a center of the virtual object; and in response to determining that the interactive behavior is located in the target area of the virtual object, determining that the virtual object associated with the haptic feedback interaction is contacted.

17. The hand gesture tracking method of claim 13, wherein when the at least one inactivating condition comprises the target path determination condition, the hand gesture tracking method further performs the following steps:

calculating a hand movement path of the user;

determining whether the hand movement path is on a target path based on the hand gesture tracking, wherein the target path is composed of a current hand position of the user and a spatial position corresponding to the virtual object; and in response to determining that the hand movement path is on the target path, determining that the virtual object associated with the haptic feedback interaction is contacted.

18. A non-transitory computer readable storage medium, having a computer program stored therein, wherein the computer program comprises a plurality of codes, the computer program executes a hand gesture tracking method after being loaded into an electronic device, the electronic device is communicatively connected to a wearable device, the wearable device is configured to generate an inertial sensing data corresponding to a user, the wearable device comprises a haptic feedback device, the hand gesture tracking method comprises:

performing a hand gesture tracking corresponding to the user based on a plurality of real-time images and the inertial sensing data, wherein the real-time images include a user hand or the wearable device used by the user;

determining whether a virtual object associated with a haptic feedback interaction is contacted based on the hand gesture tracking and a plurality of eyeball trajectories;

in response to determining that the virtual object associated with the haptic feedback interaction is contacted, triggering the haptic feedback device of the wearable device to execute the haptic feedback interaction corresponding to a time interval; and inactivating the inertial sensing data corresponding to the wearable device to perform the hand gesture tracking corresponding to the time interval, wherein the step of determining whether the virtual object associated with the haptic feedback interaction is contacted comprises the following steps:

generating a gaze position corresponding to the user based on the plurality of eyeball trajectories;

determining whether the gaze position is located on the virtual object; and in response to determining that the gaze position is located on the virtual object, determining that the virtual object associated with the haptic feedback interaction is contacted.

\* \* \* \* \*